United States Patent
Natsume

(10) Patent No.: US 6,796,695 B2
(45) Date of Patent: Sep. 28, 2004

(54) VEHICULAR LAMP EMPLOYING LED LIGHT SOURCES

(75) Inventor: Kazunori Natsume, Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 0 days.

(21) Appl. No.: 10/378,847

(22) Filed: Mar. 5, 2003

(65) Prior Publication Data

US 2003/0169599 A1 Sep. 11, 2003

(30) Foreign Application Priority Data

Mar. 6, 2002 (JP) ..................................... P.2002-060032

(51) Int. Cl.⁷ ................................................. F21V 7/00
(52) U.S. Cl. ..................... 362/518; 362/296; 362/346; 362/545
(58) Field of Search ................................. 362/516, 517, 362/518, 296, 297, 346, 544, 236, 241, 545, 235, 543

(56) References Cited

U.S. PATENT DOCUMENTS

| | | | | |
|---|---|---|---|---|
| 4,733,335 A | | 3/1988 | Serizawa et al. | |
| 4,929,866 A | * | 5/1990 | Murata et al. | 313/500 |
| 5,453,855 A | | 9/1995 | Nakamura et al. | |
| 5,642,933 A | * | 7/1997 | Hitora | 362/243 |
| 6,234,646 B1 | * | 5/2001 | Ito | 362/235 |
| 6,238,073 B1 | * | 5/2001 | Ito et al. | 362/544 |

FOREIGN PATENT DOCUMENTS

JP         61-183004         11/1986

* cited by examiner

*Primary Examiner*—John Anthony Ward
(74) *Attorney, Agent, or Firm*—Sughrue Mion, PLLC

(57) ABSTRACT

A vehicular lamp utilizing an indirect lighting technique employing a plurality of LED light sources and which has a slim profile and improved appearance when lit. A reflector is provided which is composed of a plurality of small reflectors having a serrated shape and arranged in a linear array extending in the lateral direction. A LED light source is provided in a space to the side of each of the small reflectors, and light is radiated onto the reflecting surface of the adjacent small reflector. With this configuration, there is no need of providing a special cover member to hide the LED light sources when viewed from the front of the lamp. The small reflectors may also be arranged in a rectilinear array to achieve a uniformly illuminated generally planar surface.

9 Claims, 6 Drawing Sheets

VEHICULAR LAMP EMPLOYING LED LIGHT SOURCES

CROSS-REFERENCE TO RELATED APPLICATIONS

Not applicable

STATEMENT REGARDING FEDERALLY SPONSORED RESEARCH OR DEVELOPMENT

Not applicable

REFERENCE TO SEQUENCE LISTING, A TABLE, OR A COMPUTER PROGRAM LISTING COMPACT DISK APPENDIX

Not applicable

BACKGROUND OF THE INVENTION

The present invention relates to a vehicular lamp provided with a plurality of LED sources, more particularly to a vehicular lamp configured so as to radiate light using an indirect lighting technique.

Recently, vehicular lamps using LEDs as light sources have come into widespread use. For example, Japanese Patent Publication No. 3173453 and Japanese Patent Laid-Open Publication No. 11-306810 describe a vehicular lamp in which a plurality of LED sources are arranged in a linear array and positioned in such manner they cannot be seen directly from the front of the lamp. Light is reflected from each of the LED sources in the forward direction of the lamp. Such a lamp provides soft illumination due to the use of an indirect lighting technique.

However, in such a conventional vehicular lamp where the LED light sources are arranged in a linear array extending in a direction perpendicular to the beam of light radiated from the lamp, a cover member is required which covers all of the LED light sources so that they cannot be observed directly from the front of the lamp. When the lamp is viewed from the front, a belt-like shadow caused by the cover member detracts from the appearance of the lamp.

Proposals have been made to solve this problem by eliminating the cover member. Such an approach, however, makes it difficult to make lamp slim.

BRIEF SUMMARY OF THE INVENTION

The present invention is made in view of the foregoing circumstances, and it is an object of the invention to provide a vehicular lamp configured such that light is radiated using an indirect lighting technique employing a plurality of LEDs as light sources while exhibiting a good appearance when lit and achieving a slim profile for the lamp.

In order to achieve the above and other objects, the present invention provides a vehicular lamp having a reflector of an improved design and improved arrangement of the LED light sources.

Specifically, a vehicular lamp according to the present invention includes a plurality of LED light sources and a reflector that reflects light from the LED light sources forward of the lamp, the light sources and reflector being housed inside a lamp chamber defined by a lamp body and a translucent cover. The reflector is provided with a plurality of small reflectors of a serrated shape arranged in an array extending in a predetermined direction transverse to the longitudinal direction of the lamp. The reflecting surface of each of the small reflectors is composed of a plurality of step-like reflecting elements extending in the predetermined direction. Each of the LED light sources is mounted in a space to the side of the corresponding adjacent small reflector and directed so that its light output is irradiated onto the reflecting surface of the corresponding small reflector.

The reflector may be formed of a plurality of small reflectors formed integrally with one another, or of separate small reflectors. Alternatively, the lamp body can be constructed to function as the reflector.

The above-mentioned predetermined direction is not limited to a specific direction as long as it is transverse to the longitudinal direction of the lamp. For example, the predetermined direction may parallel to the lateral or vertical direction of the lamp.

Serrated shape herein refers to a configuration where a plurality of inclined portions arranged in a step-like configuration are oriented at substantially the same angle are arranged in an array.

The specific configuration of each of the small reflectors is not limited as long as the reflecting surface of each is composed of a plurality of reflecting elements that are divided in a step-like manner in the predetermined direction. The reflecting surface of the small reflector may be divided into a plurality of reflecting elements extending only in the predetermined direction, or it additionally may be divided into a plurality of reflecting elements extending also in the direction perpendicular to the predetermined direction.

As used herein, the term space or position to the side of the small reflector refers to a space or position which is lateral of the small reflector and which cannot be seen from the front of the lamp.

As apparent from the description above, a vehicular lamp according to the present invention is provided with a plurality of LED light sources and a reflector that reflects light from the LED light sources forward of the lamp, with the LED light sources and the reflector being housed in a lamp chamber defined by a lamp body and a translucent cover. Further, the reflector is composed of a plurality of small reflectors arranged in a serrated shape extending in a predetermined direction that crosses the longitudinal direction of the lamp, and each of the LED light sources is mounted at a position to the side of adjacent the small reflectors so that light can be radiated onto the reflecting surface of the adjacent small reflector. With this construction, the following effects of the invention are achieved.

Since each of the LED light sources is provided in a space to the side of the corresponding one of the small reflectors that are arranged in a serrated shape, there is no need of providing a special cover member to hide the LED light sources when the lamp is viewed from the front. Therefore, it is possible to solve the problem which occurs in the conventional case that the appearance of the lamp when lit is degraded when viewed from the front due to the belt-like shadow from the cover member. Further, there is no need of providing a separate cover member, which contributes to making the lamp slim.

Moreover, since the reflecting surface of each of the small reflectors is composed of a plurality of smaller reflecting elements that are formed in a step-like manner, a slim vehicular lamp is easy to achieve. Further, it is possible to illuminate the entire reflecting surface at substantially equal intensity.

Therefore, according to the present invention, with a vehicular lamp arranged such that light is radiated employing an indirect lighting technique using a plurality of LED light sources, it is possible to realize a lamp which has a slim profile as well as an improved appearance when lit.

In the configuration described above, it is not necessary to provide a separate member to attach the LED light sources if the small reflectors are integrally formed with a protruding piece that extends into a space behind the small reflector and the light source is attached to the protruding piece. With the LED light source attached via the protruding piece as explained above, the orientation of the light beam radiated from the light source can be set arbitrarily, compared to the case where a LED light source is attached directly to the rear surface of the reflecting surface of each of the small reflectors. With this configuration, it is possible to secure a greater amount of light flux entering the reflecting surface of a small reflector corresponding to the LED light source.

In this case, if the protruding piece is formed at an edge portion of the reflecting surface of the small reflector, formation of dent or the like on the reflecting surface caused by the protruding piece can be prevented or effectively restrained.

In the configuration described above, if the plurality of small reflectors are formed by integral molding, the number of parts can be reduced and the assembly process for vehicular lamp can be simplified. Also, the positioning accuracy between each of the LED light sources and each of the small reflectors to which light from each of the LED light sources is radiated can be improved.

Further, in the configuration described above, if a plurality of sets constituted by a plurality of small reflectors are arranged in a rectilinear array extending both in the predetermined direction of arrangement and in a direction perpendicular to that direction, a substantially planar illuminated surface is obtained. Also, by providing an appropriate number of small reflectors in each set, it is easy to make the outer shape of the reflector suitable for the particular vehicular lamp shape.

DETAILED DESCRIPTION OF THE INVENTION

Hereinafter, preferred embodiments of a vehicular lamp constructed according to the present invention will be explained with reference to the accompanying drawings.

Figure 1:
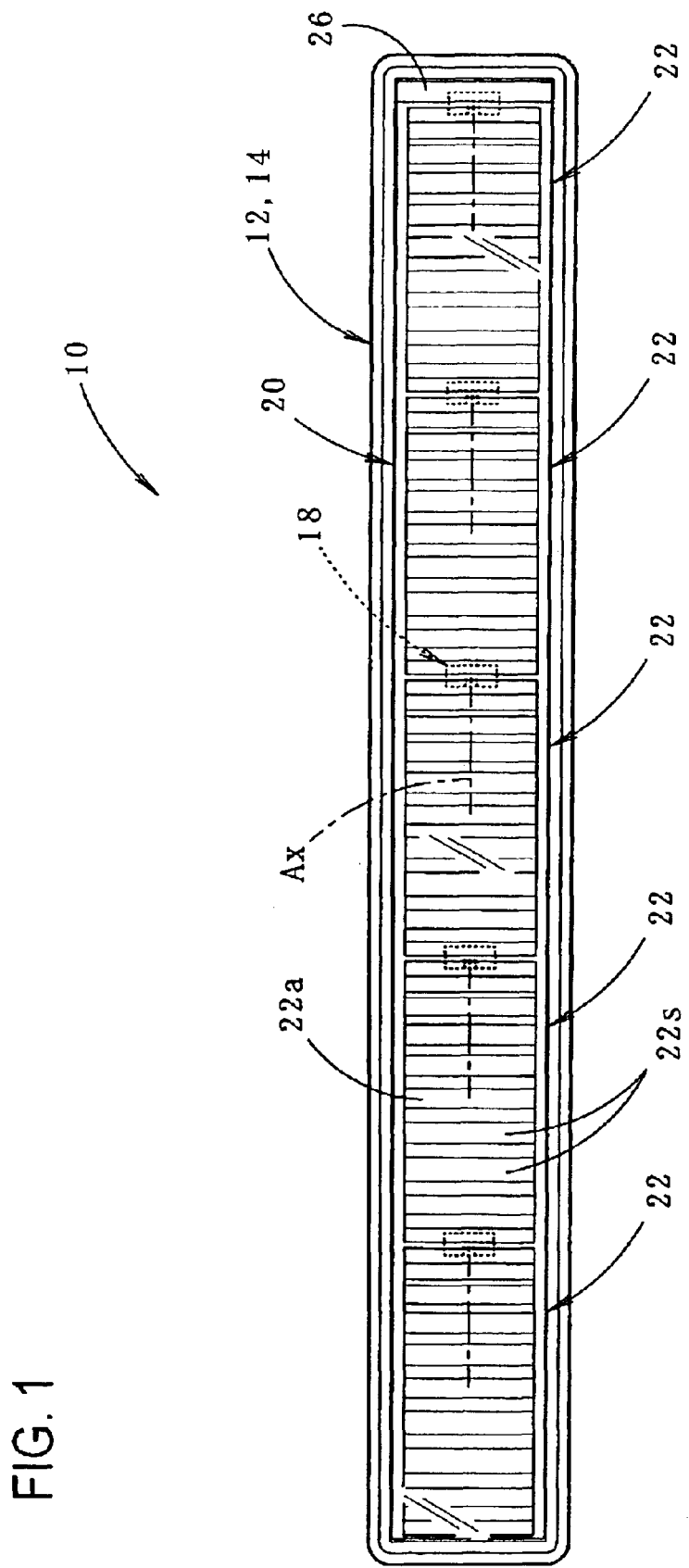
FIG. 1 is a front view of a vehicular lamp constructed according to a preferred embodiment of the present invention.
Figure 2:
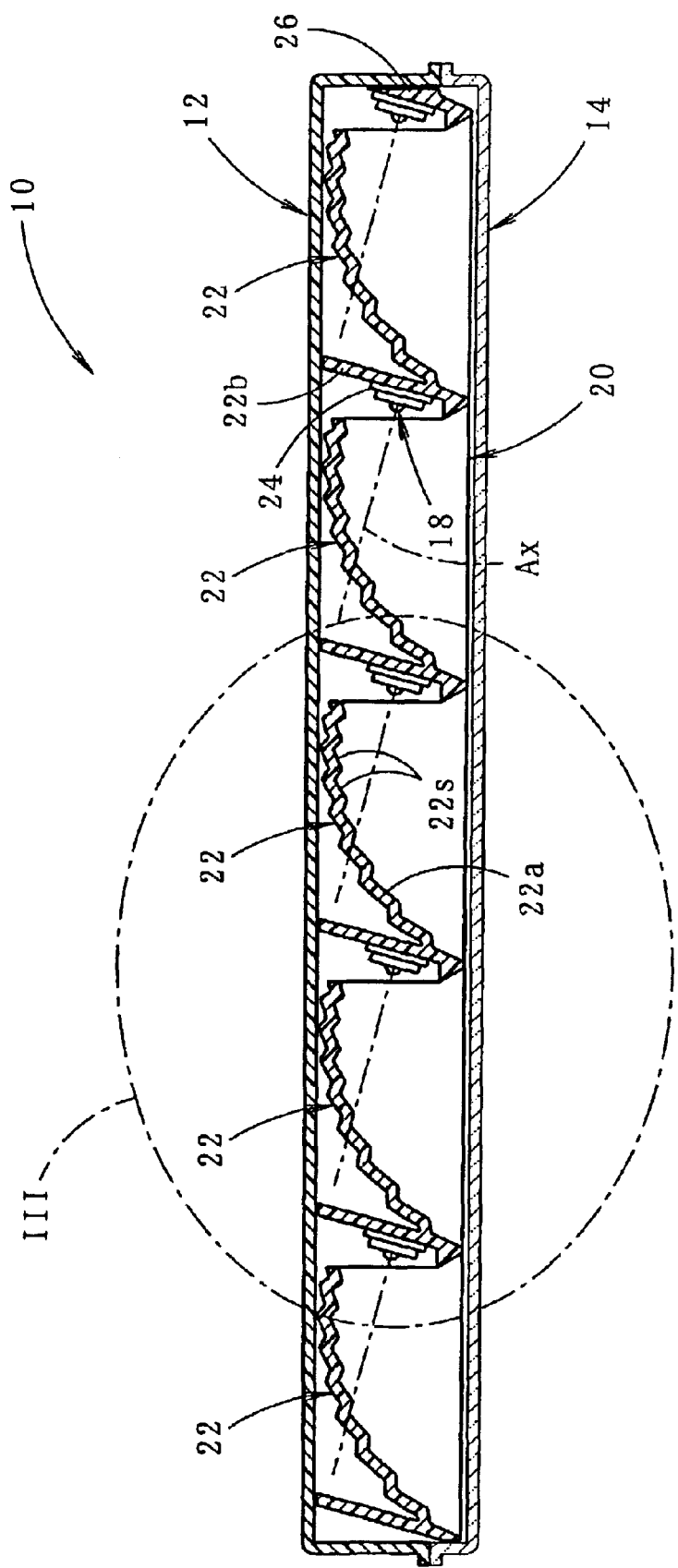
FIG. 2 is a horizontal cross-sectional view of the vehicular lamp of FIG. 1.

FIG. 1 is a front view of a vehicular lamp of a first embodiment of the invention, and FIG. 2 is a horizontal cross-sectional view thereof.

As shown in FIGS. 1 and 2, a vehicular lamp 10 according to the invention is embodied as a tail lamp designed for mounting at a rear end portion of the vehicle. The vehicular lamp 10 includes a plurality (five) of LED light sources 18 and a reflector 20 that reflects light from the LED light sources 18 forward of the lamp. These components are housed within a lamp chamber defined by a lamp body 12 and a plain translucent cover 14.

The reflector 20 is composed of a plurality (five) of small reflectors 22 molded integrally with one another. The small reflectors 22, which each have a serrated shape, and extend in the lateral direction, namely, a direction transverse to the longitudinal direction of the lamp. The reflecting surface 22a of each of the small reflectors 22 is composed of a plurality of reflecting elements 22s arranged in a step-like configuration extending in the lateral direction.

Each of the LED light sources 18 is provided in a space to the side of the corresponding one of the small reflectors 22, and light from the LED light source 18 is directed toward the leftwardly adjacent reflecting surface 22a of the corresponding one of the small reflectors 22. Each of the small reflectors 22 is integrally formed with a protruding piece 22b that extends to a space to the side of each of the small reflectors 22, and the LED light source 18 is attached to the protruding piece 22b via a circuit board 24.

No LED light source 18 is provided in the space to the left of the small reflector 22 at the left end portion because there is no small reflector 22 to the left side thereof. An LED light source 18 that directs light onto a small reflector 22 at the right end portion is mounted on a circuit board support member 26 via the circuit board 24 because there is no small reflector 22 to the right of the small reflector 22 at the right end portion. The circuit board support member 26, which is integrally formed with the small reflectors 22 and supports the LED light sources 18, has a shape such that the LED light sources 18 cannot be seen from the front of the vehicular lamp.

Figure 3:
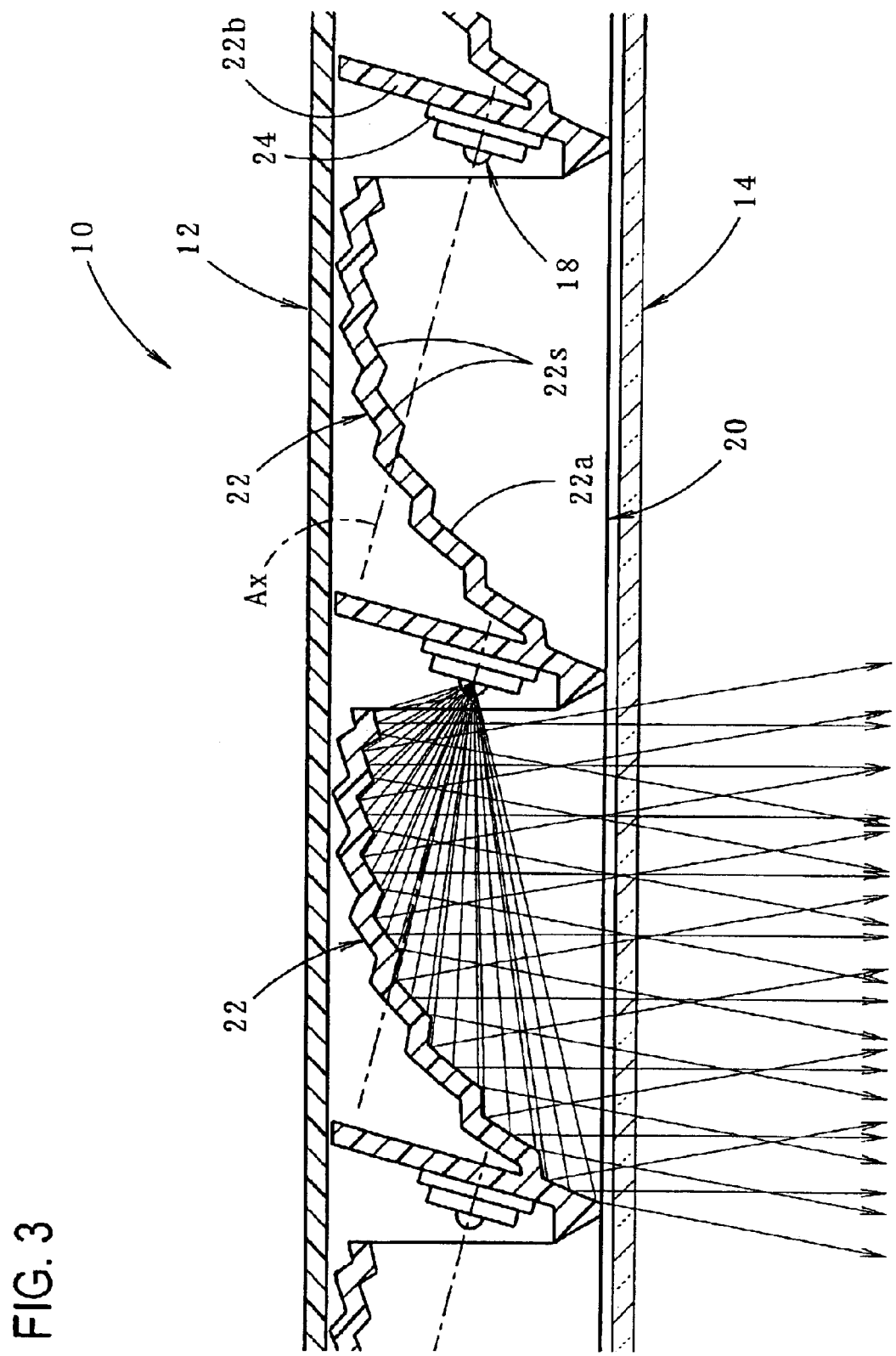
FIG. 3 is an enlarged view of a portion III indicated in FIG. 2.

FIG. 3 is an enlarged view of a portion III in FIG. 2.

As shown in FIG. 3, the axis Ax of the output beams of each of the LED light sources is angled slightly rearward with respect to the leftward direction (for example, 15 degrees, angled slightly rearward with respect to the leftward direction). Each protruding piece 22b is formed such that it extends from the left end portion of the reflecting surface 22a to its right to a position behind the rearmost point of the small reflector 22, that is, slightly rearward with respect to the rightward direction (the direction perpendicular to the light axis Ax).

The reflecting surface 22a of each of the small reflectors 22 is arranged such that the reflecting surface 22a crosses the light axis Ax of each of the LED light sources 18 in the longitudinal direction. Further, the plurality of reflecting elements 22s constituting each reflecting surface 22a are arranged so as to reflect light from the corresponding LED light source 18 in a diffused manner both in the rightward and leftward directions with respect to the vehicular lamp as viewed from the front. The diffusion angles in the rightward and leftward directions are uniformly set for each of the reflecting elements 22s.

Figure 4:
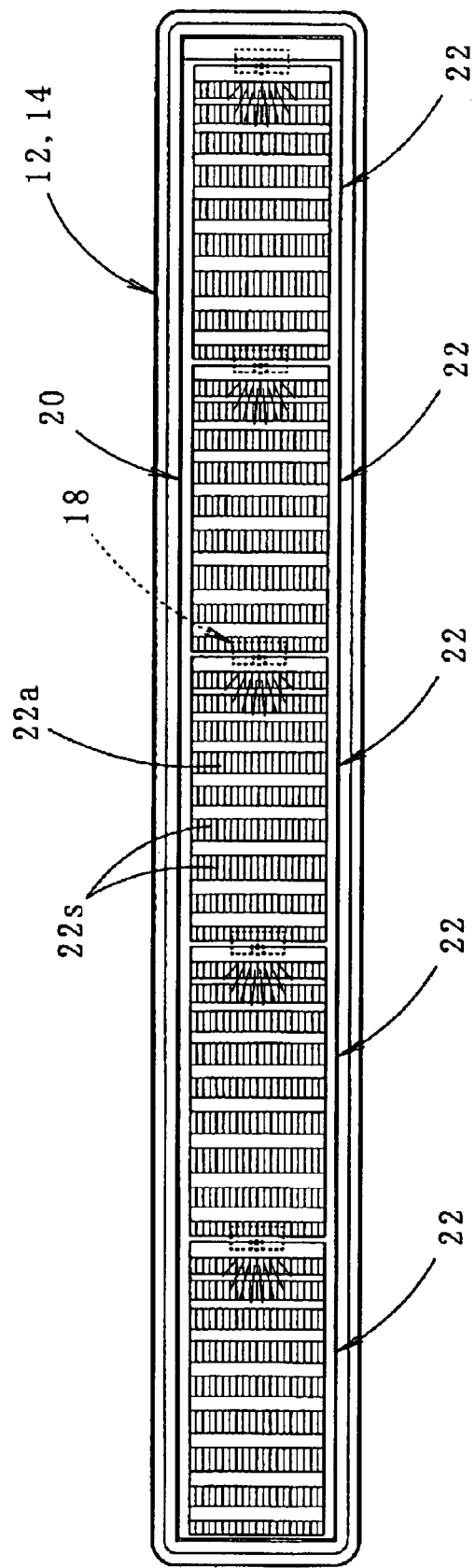
FIG. 4 shows the vehicular lamp in a lit state as viewed from the front.

FIG. 4 shows the appearance of the vehicular lamp 10 when it is in a lit state as viewed from the front.

As shown in this drawing, when the vehicular lamp is lit, each of the reflecting elements 22s constituting the reflecting surface 22a of each of the small reflectors 22 is illuminated to thus produce a vertically striped pattern, which causes the entire vehicular lamp to be illuminated with substantially equal intensity.

As explained in detail above, the vehicular lamp 10 constructed according to the preferred embodiment includes the plurality of LED light sources 18 and the reflector 20 that reflects light from the LED light sources 18 forward of the lamp. These components are housed inside the lamp chamber defined by the lamp body 12 and the translucent cover 14. The reflector 20 is provided with the plurality of small reflectors 22 having a serrated shape in the lateral direction, and each of the LED light sources 18 is mounted in a space to the side of the corresponding one of the small reflectors 22 so that light can be radiated onto the reflecting surfaces 22a of the adjacent small reflector 22. With this construction, the following effects of the invention are obtained.

Since each of the LED light sources 18 is mounted in a space to the side of the respective one of the small reflectors 22, there is no need of providing a special cover member to hide the LED light sources from view from the front of the lamp. Therefore, it is possible to solve the problem which occurs in the conventional case that the appearance of the lamp when lit is degraded when viewed from the front of the lamp due to the belt-like shadow cast by the cover member. There is no need of providing a cover member, and therefore a vehicular lamp having a slim profile is easy to achieve.

Moreover, since the reflecting surface 22a of each of the small reflectors 22 is configured by the plurality of reflecting elements 22s that are divided in a step-like manner, a slim vehicular lamp is easy to achieve in this respect too. Further, it is possible to make the entire reflecting surface 22a illuminated at substantially equal intensity.

As explained so far, according to the embodiment, it is possible to realize a slim vehicular lamp as well as a lamp having an improved appearance when lit.

Especially, according to this embodiment, it is not necessary to provide a separate member on which to mount the plurality of LED light sources 18 (the circuit board support member 26 for attaching the LED light source 18 at the right-end portion is exceptional) since the protruding piece 22b is integrally formed with each of the small reflectors 22 and extends into a space behind the small reflector 22, and the light source 18 is attached to the protruding piece 22b. Further, with the LED light source 18 attached via the protruding piece 22b as explained above, the direction of light radiated from the light source 18 can be set arbitrarily, compared to the case where the LED light source 18 is attached directly to the side surface of the reflecting surface 22a of each of the small reflectors 22. This allows a greater amount of light flux to reach the reflecting surfaces 22a of the small reflectors 22 from the corresponding LED light sources 18.

Since the protruding piece 22b is formed at the edge portion of the reflecting surface 22a of the small reflector 22, damage or distortion to the reflecting surface 22a is prevented.

Further, since the plurality of small reflectors 22 and the circuit board support member 26 are formed as an integral unit by molding, the total number of parts can be reduced and the assembly process for the lamp simplified. Also, the positioning accuracy between each of the LED light sources 18 and the corresponding small reflectors 22 can be improved.

A modification of the above-described embodiment now will be explained.

Figure 5:
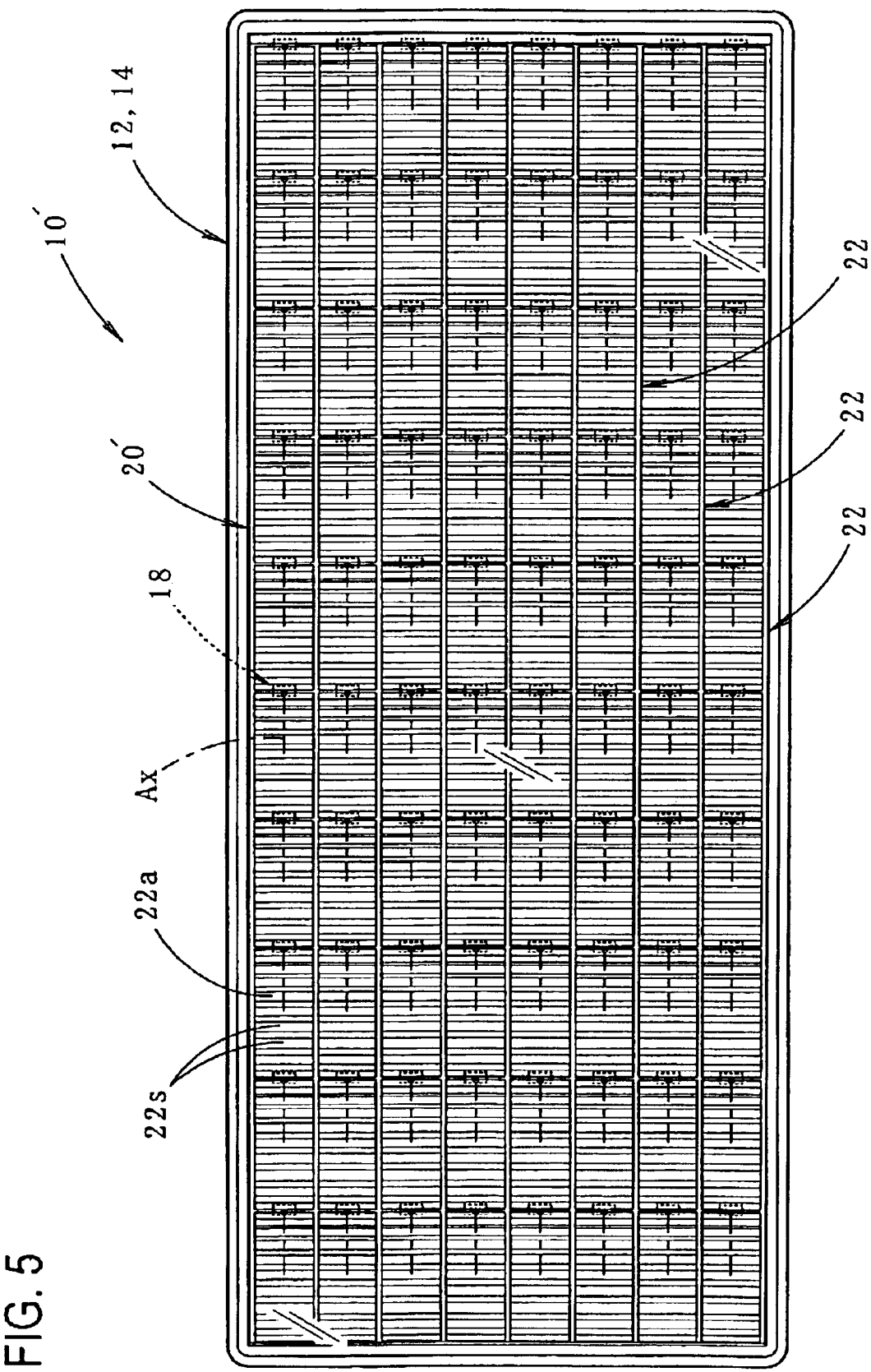
FIG. 5 is a view similar to FIG. 1 showing the vehicular lamp constructed according to a modification of the above embodiment.

FIG. 5 is a front view of a vehicular lamp 10' according to the modification.

The reflector 20 of the vehicular lamp 10 according to the above-described embodiment is configured such that the plurality of small reflectors 22 have a serrated shape and are arranged in a linear array in the lateral direction. However, as shown in FIG. 5, according to the modification the reflector 20' of the vehicular lamp 10' is configured such that a plurality (eight) of sets composed of a plurality (10) of small reflectors 22 having a serrated shape are also arrayed linearly in the vertical direction.

Figure 6:
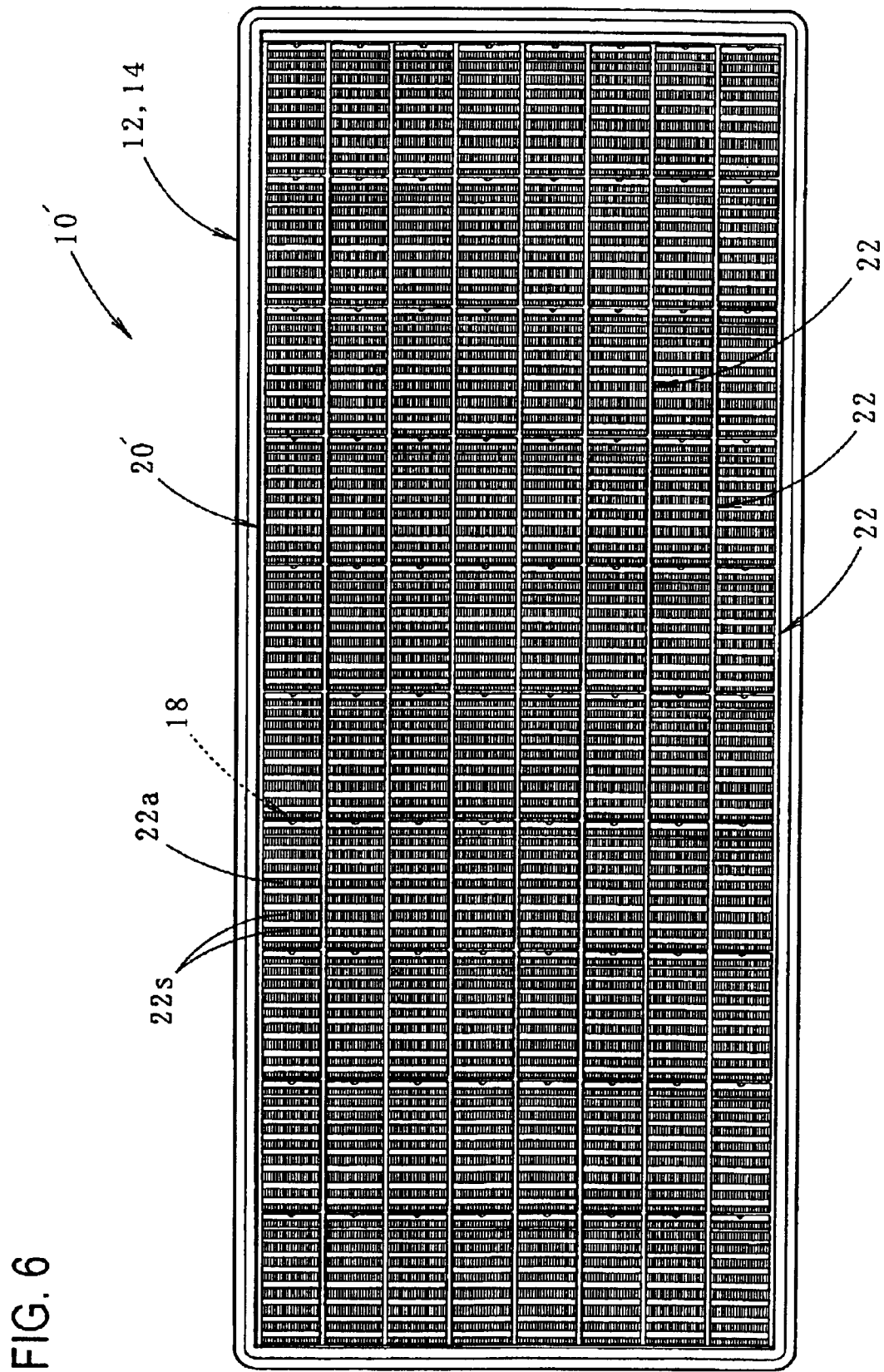
FIG. 6 is a view similar to FIG. 4 showing the effects of the modification.

FIG. 6 shows the appearance of the vehicular lamp 10' when lit and as viewed from the front.

As shown in this drawing, in the reflector 20' when the vehicular lamp is lit, each of the reflecting elements 22s constituting the reflecting surface 22a of each of the small reflectors 22 is illuminated, resulting in a vertically striped pattern. However, since the plurality of small reflector 22 are arranged in a lattice-like pattern vertically and horizontally, a generally planar illuminated surface is obtained. By appropriately setting the number of small reflectors 22 constituting each set of the reflector 20', a desired outer shape of the reflector 20' can readily be obtained.

The foregoing embodiment and modification have been explained with respect the case where the small reflectors 22 constituting the reflectors 20, 20' have a serrated shape and are arranged in a linear array in the lateral direction. However, the same effects can be obtained if the small reflectors 22 are arrayed in a direction other than the lateral direction (for example, the vertical direction).

Further, the foregoing embodiment and modification have been described with reference to the case where the vehicular lamps 10, 10' are tail lamps. However, the same effects can be obtained if the invention is embodied as a stop lamp or clearance lamp as long as the lamp has the same general configuration and design as the aforementioned embodiment and modification.

It should further be apparent to those skilled in the art that various changes in form and detail of the invention as shown and described above may be made. It is intended that such changes be included within the spirit and scope of the claims appended hereto.

What is claimed is:

1. A vehicular lamp comprising: a plurality of LED light sources, a reflector for reflecting light from said LED light sources forward of said lamp, and a lamp chamber comprising a lamp body and a translucent cover for housing said LED light sources and said reflector, said reflector comprising a plurality of small reflectors, each of said small reflectors having a serrated pattern such that a reflecting surface of each of the small reflectors is formed by a plurality of reflecting elements divided in a step-like manner and each of said small reflectors extending in a predetermined direction, said small reflectors being arrayed in said predetermined direction, said predetermined direction crossing a longitudinal direction of said lamp, each of said LED light sources being mounted in a space to a side of a corresponding one of said small reflectors at a position where said LED light source is not visible from in front of said lamp, each of said LED light sources radiating light onto a corresponding one of said small reflectors.

2. The vehicular lamp according to claim 1, further comprising a plurality of protruding pieces, each of said protruding pieces being formed integrally with a corresponding one of said small reflectors, each of said protruding pieces extending into a space behind the corresponding small reflector, a corresponding LED light source being mounted on said protruding piece.

3. The vehicular lamp according to claim 2, wherein each of said protruding pieces is formed at an edge portion of a reflecting surface of the corresponding small reflector.

4. The vehicular lamp according to claim 1, where said plurality of small reflectors are formed integrally with one another by molding.

5. The vehicular lamp according to claim 1, wherein the reflecting elements extend in a direction transverse to the predetermined lengthwise direction.

6. A vehicular lamp comprising: a plurality of LED light sources, a reflector for reflecting light from said LED light sources forward of said lamp, and a lamp chamber comprising a lamp body and a translucent cover for housing said LED light sources and said reflector, said reflector comprising a plurality of small reflectors, each of said small reflectors having a serrated pattern such that a reflecting surface of each of the small reflectors is formed by a plurality of reflecting elements divided in a step-like manner and each of said small reflectors extending in a predetermined direction, said predetermined direction crossing a longitudinal direction of said lamp, said small reflectors being arranged in a rectilinear array extending in said predetermined direction and in a direction perpendicular to said predetermined direction, each of said LED light sources being mounted in a space to a side of a corresponding one of said small reflectors at a position where said LED light source is not visible from in front of said lamp, each of said LED light sources radiating light onto a corresponding one of said small reflectors.

7. The vehicular lamp according to claim 6, further comprising a plurality of protruding pieces, each of said protruding pieces being formed integrally with a corresponding one of said small reflectors, each of said protruding pieces extending into a space behind the corresponding small reflector, a corresponding LED light source being mounted on said protruding piece.

8. The vehicular lamp according to claim 7, wherein each of said protruding pieces is formed at an edge portion of a reflecting surface of the corresponding small reflector.

9. The vehicular lamp according to claim 6, where said plurality of small reflectors are formed integrally with one another by molding.

* * * * *